United States Patent [19]
Franciskovich

[11] Patent Number: 5,309,665
[45] Date of Patent: May 10, 1994

[54] FLYING ACTION FISHING LINE

[76] Inventor: Mark Franciskovich, 26W421 MacArthur, Wheaton, Ill. 60188

[21] Appl. No.: 41,714

[22] Filed: Apr. 1, 1993

[51] Int. Cl.$^5$ .............................................. A01K 85/00
[52] U.S. Cl. .................. 43/42.26; 43/42.28; 43/42.35
[58] Field of Search ............ 43/4.5, 42.28, 42.26, 43/42.27, 42.22, 42.35, 42.37, 42.1

[56] References Cited
U.S. PATENT DOCUMENTS

| | | | |
|---|---|---|---|
| 2,216,688 | 10/1940 | Harvey | 43/42.28 |
| 2,218,280 | 10/1940 | Deering | 43/42.26 |
| 2,596,474 | 5/1952 | Espey | 43/42.35 |
| 2,672,704 | 3/1954 | Smith | 43/42.35 |
| 2,781,604 | 2/1957 | Brown | 43/42.28 |
| 3,702,035 | 11/1972 | Pope | 43/42.35 |

Primary Examiner—Kurt C. Rowan
Attorney, Agent, or Firm—Kajane McManus

[57] ABSTRACT

The flying action fishing lure includes a body which is oval or torpedo shaped and has a pair of wings engaged thereon to simulate the shape of an insect. The lure has an elevated line engaging eye mounted to the body as well as a fixed in position single or multiple pronged hook depending therefrom. The body of the lure is partially hollow, trapping a bubble of air therein which is dimensioned to provide a zero flotation coefficient. Action is produced by application of steady pressure to a line engaging the lure causing a sideway slip as well as rotational motion and in and out of water flying action to the lure.

4 Claims, 2 Drawing Sheets

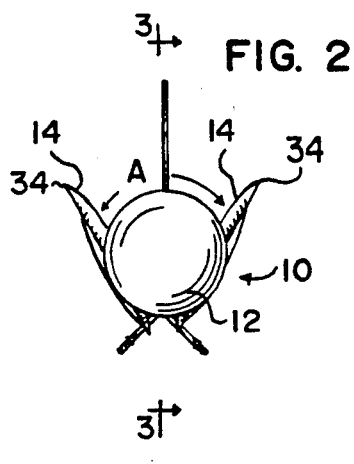
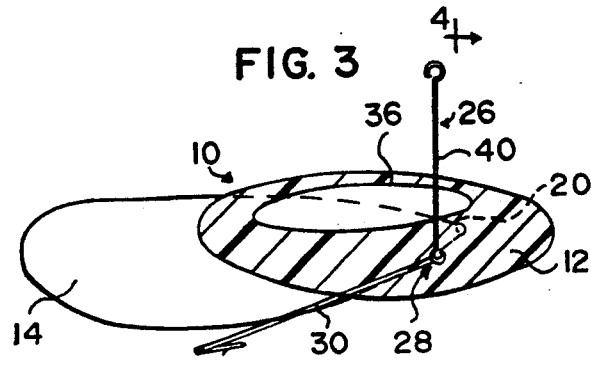
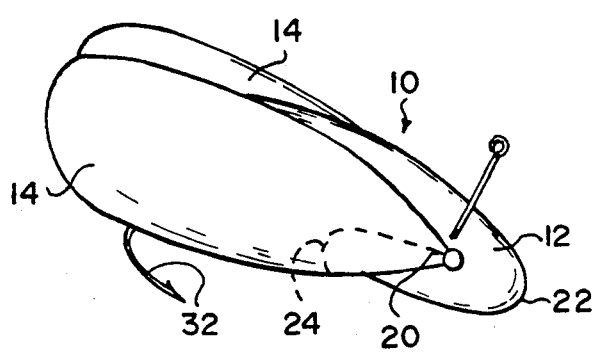
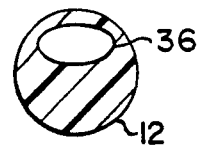
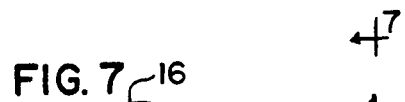
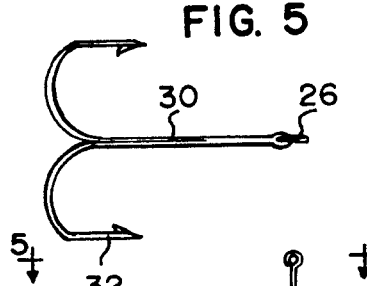
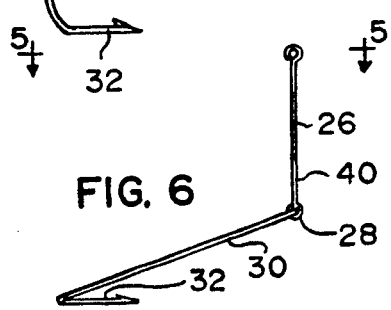
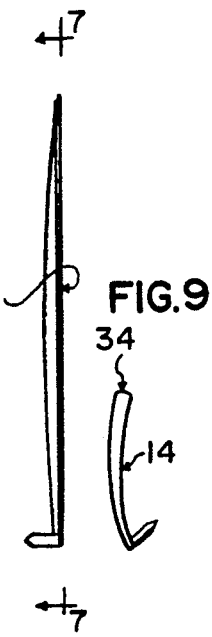

FLYING ACTION FISHING LINE

BACKGROUND OF THE INVENTION

1. Field of the Invention

The present invention relates to a fishing lure. More specifically, the lure has a zero flotation coefficient, has wings mounted on a body portion thereof and which, when continuous pull is produced on a line engaged thereto, causes a unique side slip and rotational action in water as well as causing the lure to fly out of and back into the water.

2. Description of the Prior Art

Heretofore, a great multitude of different types of fishing lures have been proposed, as found in the art.

For example, the Bennett U.S. Pat. No. 2,719,377 discloses a jig type fishing lure which looks like a dragon fly and is capable of scaling or gliding when cast, to simulate the insect it resembles. The lure is highly buoyant and can be brought out of the water into flight by jerking the line to which it is attached.

The Jacobs U.S. Pat. No. 3,871,122 discloses another dragon fly type lure. Twitching of a line to which the lure is attached will cause wing flutter, simulating the insect in distress.

The Shiverdecker U.S. Pat. No. 4,232,469 discloses a fishing lure for simulating the flapping and fluttering of a non-aquatic bird which has fallen in the water.

Further, U.S. Pat. No. 5,133,146 discloses a blade type lure including a heavy weight body and a projecting, concave blade portion which acts as a tiller. Such lures do not exhibit significant side to side motion, but slowly descend to depths greater than those reachable with spoon lures.

As will be described in greater detail hereinafter, the flying action fishing lure of the present invention is structured to provide sideways darting of the lure while in water and produces an out of water intermittent flying action with only a constant pull being applied thereto by the line to which it is attached.

SUMMARY OF THE INVENTION

According to the invention there is provided a fishing lure which dives into and flies above the water within which it is placed, rotates, and jogs to one side, simulating a water bound insect, the lure comprising:

a body having an elongate oval shape, the body having a hollow area of predetermined size therein within which a predefined volume of air is entrapped;

an elevated line eye extending upwardly from the body, and set approximately one third the distance back from a forward end of the body;

a pair of dished wings engaged to the body to extend upwardly along and away from an underside of the body opposite the line eye, the body being cupped within the dished are of each wing and the wings extending rearwardly past a rear end of the body;

and a hook fixedly engaged to the body in a manner to extend rearwardly downwardly from a rear portion of the body, the hook underlying the wings; and the volume of the hollow area of the body being placed rearwardly within the body and being calculated from:

$$V_{air} = (p_w p_p - 1)V_{plastic} + (p_w p_s - 1)V_{hook} + (p_w p_{wing} - 1)V_{wing}$$

where
- $V_{air}$ = volume of air required for zero coefficient of flotation
- $p_p$ = density of plastic used
- $p_w$ = density of water
- $V_{plastic}$ = volume of plastic used
- $p_s$ = density of material of fishing hook
- $V_{hook}$ = volume of hook material
- $p_{wing}$ = density of wing material
- $V_{wing}$ = volume of wing material used producing a zero coefficient of flotation for the lure.

BRIEF DESCRIPTION OF THE INVENTION

FIG. 1 is a perspective view of the lure of the present invention.

FIG. 2 is a front-end view of the lure FIG. 1.

FIG. 3 is a cross sectional view through the lure and is taken along line 3—3 of FIG. 2.

FIG. 4 is a cross sectional view through the lure and is taken along line 4—4 of FIG. 3.

FIG. 5 is a plan view of the fixed in position hook of the lure.

FIG. 6 is a side view of the hook showing same pivotably engaged to one end of a line eye extending into a body of the lure.

FIG. 7 is a plan view of one wing of the lure.

FIG. 8 is a side view of the wing of FIG. 7.

FIG. 9 is an end view of the wing of FIG. 7.

DESCRIPTION OF THE PREFERRED EMBODIMENT

Figure 10:
FIG. 10 is a diagram showing the sequence of in and out of watermotion of the lure as well as rotational motion thereof.

Referring now to the drawings in greater detail, there is illustrated therein a flying action fishing lure made in accordance with the teachings of the present invention and generally identified by the reference numeral 10.

The lure 10 includes a body 12 having a pair of wings 14 attached thereto and lying along a longitudinal length of the body 12. The wings 14 are longer than the body 12 and give the lure 10 a lateral appearance simulating that of an inverted insect, as shown.

The wings 14 as best shown in FIG. 2 extend upwardly and away from the body 12, creating an angle A therebetween of approximately 60°. Through empirical testing it has been found that this angulation provides the appropriate lift to allow the lure 10 to exit from and sail above the water as will be described in greater detail hereinafter.

As best shown in FIGS. 7-9, the wings 14 are elliptical in shape, widening toward a rear end 16 thereof. When viewed from the side, each wing 14 is slightly dished, with a narrow hollow 18 created therein accepting a contiguous portion of the body 12 therein, with the material of the wings 14 thinning toward the rear end 16 thereof and thickening toward an upper edge 17 thereof.

The wings 14 are fixed in position on the body 12 with a forward narrow end 20 of each wing 14 being located approximately one third or less the distance back from a forward end 22 of the body 12. Such fixation includes placement of a small rearwardly angled pin 23 into a bore (not shown) for same created in the body 12, the pin 23 maintaining angled position of the wing 14 relative to the body 12.

Only a forward lower area 24 of each wing 14 extending back from the pin 23 is fixed to the body 12. This allows the wings 14 to bend away from the body 12 in areas that are unattached, such bending being limited by the characteristics of the material from which the wings 14 are to be made.

Through empirical testing it has been found that the wings 14 can be made of a translucent plastic such as an unfilled polypropylene copolymer having a specific gravity of between 0.890 and 0.905.

As will be further described in greater detail hereinafter, the specific gravity, as well as the volume of materials used must be considered to provide a zero flotation coefficient.

The body 12 is, as stated, ovaled or torpedo shaped, similar in appearance to a snake egg. In a preferred embodiment, the body 12 is molded from an acetal copolymer having a specific gravity of approximately 1.41.

Extending from and fixed within the body 12 is a line eye 26 to an entrapped end 28 of which is pivotably attached a single or multiple prong hook 30. The entrapped end 28 extends approximately $\frac{3}{4}$ of the way through the thickness of the body as well as extending least $\frac{3}{4}$ the thickness of the body thereabove, with the hook 30 extending downwardly and rearwardly outwardly of the body with prongs 32 of the hook 30 depending below the wings 14.

The line eye 26 extends vertically midway between the free end edges 34 of the wings 14, and is positioned approximately $\frac{1}{3}$ the distance back from the forward end 22 of the body 12, as shown.

As referred to above, it is desired to provide a lure 10 which has a zero coefficient of flotation. To provide such coefficient, and working with known dimensions and material specific gravities, it is proposed to trap a predetermined volume of air within the body 12. Thus, the body 12 is molded in such a manner as to create an area 36 therein within which the predetermined volume of air is trapped to produce the desired flotation coefficient.

In this respect, the volume of air required for a lure 10 made in accordance with the teachings of the present invention may be calculated as follows:

$$V_{air} = (p_w p_s - 1)V_{plastic} + (p_w p - 1)V_{hook} + (p_w - p_{wing} - 1)V_{wing}$$

where
- $V_{air}$ = volume of air required for zero coefficient of flotation
- $p_p$ = density of plastic used
- $p_w$ = density of water
- $V_{plastic}$ = volume of plastic used
- $p_s$ = density of material of fishing hook
- $V_{hook}$ = volume of hook material
- $p_{wing}$ = density of wing material
- $V_{wing}$ = volume of wing material used producing a zero coefficient of flotation for the lure.

In the preferred embodiment of the lure 10 it is proposed to make same from colored plastic. If however, the lure 10 is to be painted or otherwise modified, the density and volume of anything added would need to be calculated in, redefining the volume of air required.

Figure 11:
FIG. 11 is a diagram showing a top view of the side slipping motion of the lure and shows the lateral position relative to the vertical positions shown in FIG. 10.

Turning now to FIGS. 10 and 11, there is shown therein the action of the lure 10 when placed under constant line tension, with a line (not shown) being engaged to the line eye 26 of the lure 10.

As shown in the side view of FIG. 10, the lure 10 dips below the surface of water, and then begins to rise, breaks the surface of the water, flies through the air a distance and then heads back into the water for another dive. The flying distance is controlled by the speed at which the line is reeled in, a faster speed causing longer flights and a slower speed creating shorter flights. The diving is made possible by creating the area 36 of entrapped air toward a rear end of the lure 10, creating a "head heavy" condition.

In FIG. 11, which is a top view of lure 10, with sideways positioning being shown in correspondence with the vertical positions shown in FIG. 10, it will be seen that the lure 10 travels to one side as it breaks the water line and returns to a centerline as it reenters the water.

Further, as shown in both FIGS. 10 and 11, the lure 10 spins about a longitudinal axis thereof, the spin being clockwise when viewed from the user's position.

Action of the lure 10 is produced by the specific elevate placement of the line eye 26 relative to the lure body 12 and the position of the wings 14 relative to the line eye 26. In this respect, as a tension is placed on the line, with the increased weight of the forward end 22 of the body 12, it will be realized that the forward end 22 is pivoted downwardly until a straight line is created between the line to which the lure 10 is attached and an line eye extension member 40.

With this pivoted stance, the wings 14 extending from the body 12 are placed at a position of greater angle to the water, and create the action of resistive, slicing foils thereagainst. Such action is attractive visually as well as auditorily. Because it is desired for the hook 30 not to interfere with the action created, the hook 30 is fixed in place, rather than being pivotable and possibly offsetting the desired action by potential weight imbalance being created thereby.

It will also be understood that the lure 10 need not be limited to simulating an insect, which is shown as a preferred embodiment for purposes of illustration. Rather, the lure 10 could take on other configurations such as that of a minnow, tadpole, swimming frog, etc.

So long as the coefficient of flotation is maintained at zero for any desired embodiment, the diving and flying action will be created by placing a constant tension on the line to which the lure 10 is attached.

Further, a variety of sizes of the lure 10 may be easily accommodated as well, again so long as the coefficient of flotation is maintained at zero.

As described above, the lure 10 of the present invention has a number of advantages, some of which are inherent in the invention. Also, modifications may be proposed to the lure 10 without departing from the teachings herein. For instance, if produced without the hook 30, the lure 10 could be used as a toy to teach a child how to cast and reel. Accordingly the scope of the invention is only to be limited as necessitated by the accompanying claims.

I claim:
1. A fishing lure which dives into and flies above the water within which it is placed, rotates, and jogs to one side, simulating a water bound insect, the lure comprising:
   a body having an elongate oval shape, the body having a hollow area of predetermined size therein within which a predefined volume of air is entrapped;

an elevated line eye extending upwardly from the body, and set approximately one third the distance back from a forward end of the body;

a pair of dished wings engaged to said body to extend upwardly along and away from an underside of said body opposite said line eye, the body being cupped within the dished area of each wing and the wings extending rearwardly past a rear end of said body;

and a hook fixedly engaged to said body in a manner to extend rearwardly downwardly from a rear portion of said body, said hook underlying said wings; and the volume of the hollow area of the body being placed rearwardly within said body and being calculated from:

$$V_{air} = (p_w{}^{p_p} - 1)V_{plastic} + (p_w{}^{p_s} - 1)V_{hook} + (p_w{}^{p_{wing}} - 1)V_{wing}$$

wherein $V_{air}$ = volume of air required for zero coefficient of flotation $p_p$ = density of plastic used $p_w$ = density of water $V_{plastic}$ = volume of plastic used $p_s$ = density of material of fishing hook $V_{hook}$ = volume of hook material $p_{wing}$ = density of wing material $V_{wing}$ = volume of wing material used producing a zero coefficient of flotation for the lure.

2. A method for using a fishing lure comprising a body having an elongate oval shape, the body having a hollow area of predetermined size therein within which a predefined volume of air is entrapped;

an elevated line eye extending upwardly from the body, and set approximately one third the distance back from a forward end of the body;

a pair of dished wings engaged to said body to extend upwardly along and away from an underside of said body opposite said line eye, the body being cupped within the dished area of each wing and the wings extending rearwardly past a read end of said body;

and a hook fixedly engaged to said body in a manner to extend rearwardly downwardly from a rear portion of said body, said hook underlying said wings; and the volume of the hollow area of the body being placed rearwardly within said body and being calculated from:

$$V_{air} = (p_w{}^{p_p} - 1)V_{plastic} + (p_w{}^{p_s} - 1)V_{hook} + (p_w{}^{p_{wing}} - 1)V_{wing}$$

where $V_{air}$ = volume of air required for zero coefficient of flotation $p_p$ = density of plastic used $p_w$ = density of water $V_{plastic}$ = volume of plastic used $p_s$ = density of material of fishing hook $V_{hook}$ = volume of hook material $p_{wing}$ = density of wing material $V_{wing}$ = volume of wing material used producing a zero coefficient of flotation for the lure; said method incorporating the steps of:

tying a line from a reel to the elevated line eye;

casting the lure into a body of water; and applying a constant pull on the line.

3. The method of claim 2 wherein said lure flies further at an increased pull.

4. The method of claim 2 wherein said lure flies shorter distances when a decreased pull is produced on the line.

* * * * *